United States Patent [19]

Ishii et al.

[11] Patent Number: 5,535,864
[45] Date of Patent: Jul. 16, 1996

[54] TRANSMISSION FOR A WORKING VEHICLE

[75] Inventors: Norihiro Ishii; Masaru Iida; Hiroyoshi Shindoh; Toshikazu Matubayashi, all of Amagasaki, Japan

[73] Assignee: Kanzaki Kokyukoki Mfg. Co., Ltd., Amagasaki, Japan

[21] Appl. No.: 105,061

[22] Filed: Aug. 12, 1993

[30] Foreign Application Priority Data

Aug. 27, 1992 [JP] Japan .................. 4-060384 U

[51] Int. Cl.$^6$ .................. B60K 41/22; F16D 21/02
[52] U.S. Cl. .................. 192/3.63; 192/3.56; 192/3.58; 192/48.2; 192/48.8
[58] Field of Search .................. 192/3.63, 3.57, 192/3.58, 48.2, 48.8, 3.56; 74/15.86

[56] References Cited

U.S. PATENT DOCUMENTS

| | | | |
|---|---|---|---|
| 2,817,408 | 12/1957 | Klemm | 180/53 |
| 2,838,940 | 6/1958 | Swenson et al. | 74/15.2 |
| 3,540,297 | 11/1970 | Wagner et al. | 74/15.86 |
| 3,548,667 | 12/1970 | Hoover | 74/15.86 |
| 3,733,912 | 5/1973 | Murayama et al. | 74/15.86 X |
| 4,360,091 | 11/1982 | Sada et al. | 192/4 |
| 4,565,102 | 1/1986 | Miyahara et al. | 74/15.86 X |
| 4,677,866 | 7/1987 | Tone | 74/15.86 |
| 4,741,227 | 5/1988 | Yamada et al. | 192/48.8 X |
| 4,856,355 | 8/1989 | Ishimaru | 74/11 |

*Primary Examiner*—Andrea L. Pitts
*Attorney, Agent, or Firm*—Sterne, Kessler, Goldstein & Fox

[57] ABSTRACT

The present invention allows an operating device to be driven by power taken from an input shaft of a mechanical speed change gear. A clutch interposed between the power take-off shaft and the operating device automatically disengages when gears are being shifted to prevent the inertial rotation of the operating device from being transmitted to the input shaft during gear shifts. The inertial rotation would otherwise hinder the gear shifting operation by driving the input shaft even though the engine is disengaged by a main clutch. Inertial rotation is of special concern when synchromesh gears are used in the transmission, because it inhibits synchronization, resulting in large probability of abnormal wear to the synchronizer rings or a breakdown of clutch teeth. The present invention solves the problem of inertial rotation being transmitted from the operating device to the input shaft during the gear shifting process.

10 Claims, 5 Drawing Sheets

5,535,864

TRANSMISSION FOR A WORKING VEHICLE

FIELD OF THE INVENTION

The present invention relates to a transmission for a working vehicle, such as a tractor. The transmission has a means for transferring power from the input shaft of a mechanical speed change gear to an operating device.

PRIOR ART

Conventional transmissions with mechanical speed change gears and a power take-off mechanism are disclosed in U.S. Pat. Nos. 2,817,408, 2,838,940, 4,360,091 and 4,741,227. These transmissions use a dual clutch mechanism located at a main clutch to control the transfer of power to the power take-off shaft. Because the main clutch is located between the engine and the mechanical speed change gear, the input shaft of the transmission is not affected by inertial rotation of the operating device. As a result, the control of power transfer to the power take-off shaft is independent of the control of power transfer to the input shaft and ultimately the wheels of the working vehicle.

One of the major disadvantages of the dual clutch construction for a power take-off shaft is that the power take-off mechanism constitutes a fairly substantial and integral portion of the entire transmission. As a result, transmissions with dual clutch construction are not suitable for use on a vehicle which does not require a power take-off mechanism, because all of the parts associated with the power take-off mechanism must still be built into the transmission, which makes it uneconomical for such use.

SUMMARY OF THE INVENTION

The present invention allows power to be transferred from the input shaft of a mechanical speed change gear to an operating device. One of the potential problems arising with such construction is that the rotational inertia of the operating device could forcibly drive the input shaft during a speed change, which would make smooth speed changes difficult. In particular, the inertial rotation may hinder the synchronization required by synchromesh units, which are commonly used in mechanical speed change gears, leading to a significant probability of abnormal wear of synchronizer rings or damage to clutch teeth. The design of the present invention solves this problem because the input shaft of the mechanical speed change gear is not subjected to the inertial rotation of the operating device during speed changes.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

The part of the transmission which drives the wheels of the working vehicle will be described first.

Figure 1:
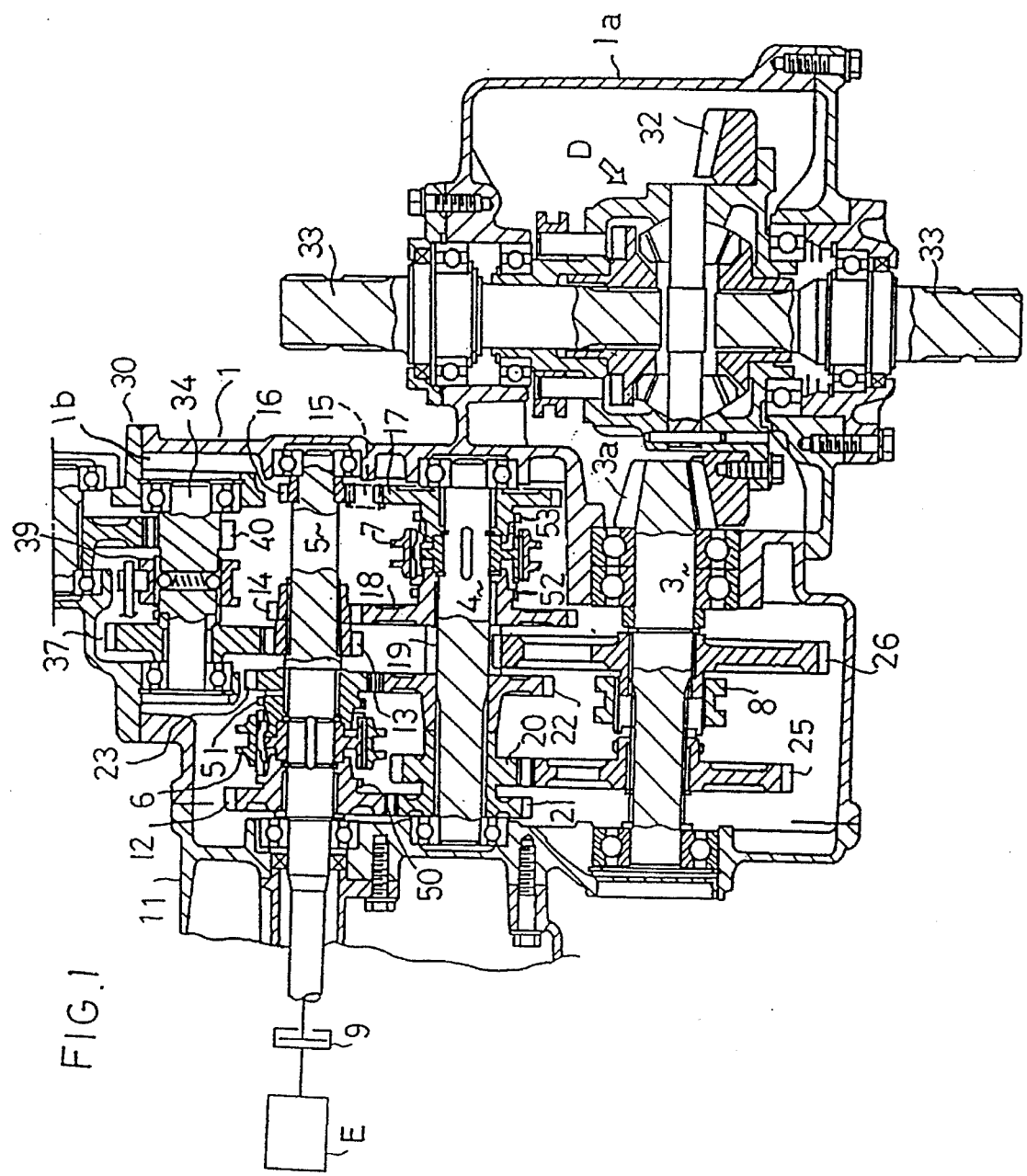
FIG. 1 is a sectional side view of a mechanical speed change gear.

Referring to FIG. 1, an output shaft 3, a reduction shaft 4, an input shaft 5, and a reversing shaft (not shown) are mounted in parallel in a housing 1. The distal end of input shaft 5 is inserted into a clutch casing 11, and receives power transmitted from an engine E through a main clutch 9.

Disposed on input shaft 5 are several gears which allow the drive ratio between the engine and the wheels of the working vehicle to be selected. From left to right, these gears are: a gear 12 for third gear in the forward direction; a gear 23 for second gear in the forward direction, a power take-off gear 13, a gear 14 for first gear in the forward direction, and a reverse direction gear 16. Reverse direction gear 16 engages with an intermediate gear 15 (shown in phantom in FIG. 1) mounted on a reversing shaft (not shown).

Reduction shaft 4 is disposed below input shaft 5 in FIG. 1. Disposed on reduction shaft 4, from left to right, are gears 21, 22, 18 and 17, which are permanently engaged with gears 12, 23, 14, and 15 respectively. Also disposed on reduction shaft 4 are a high speed gear 20 and a low speed gear 19.

Output shaft 3 is disposed below reduction shaft 4 in FIG. 1. Disposed on output shaft 3, from left to right, are gears 25 and 26, which permanently engage with high speed gear 20 and low speed gear 19 on reduction shaft 4, respectively.

Each pair of permanently engaged gears includes one gear that is attached to, and rotates with, the shaft on which it is mounted. The other gear of the pair rotates independently of the shaft on which it is mounted. When the transmission is operating, all of the gears rotate but power is transmitted between any two shafts by only one pair of gears, selected as described below. Gears 14 and 16 on input shaft 5, and gears 20 and 19 on reduction shaft 4 are attached to, and rotate with, the shaft on which they are mounted. Gears 12 and 23 on input shaft 5, gears 18 and 17 on reduction shaft 4, and gears 25 and 26 on output shaft 3 rotate independently of the shaft on which they are mounted.

The freely rotating gear of a pair of permanently engaged gears can be made to rotate with the shaft on which it is mounted by means of a synchromesh unit of the inertia lock type, which is well known in the prior art. Such a synchromesh unit is provided between gears 12 and 23 on input shaft 5. This synchromesh unit can engage either gear 12, gear 23, or neither. If gear 12 is engaged, it will rotate with input shaft 5 and power will be transmitted from input shaft 5 to reduction shaft 4 through the gears 12 and 21. If gear 23 is engaged, power will be transmitted from input shaft 5 to reduction shaft 4 through gears 23 and 22. If neither gear is engaged, power will not be transmitted through these gears.

The synchromesh unit disposed on input shaft 5 between gears 12 and 23 consists of a clutch hub 6a, a clutch sleeve 6, and synchronizer rings 50 and 51. Clutch hub 6a is mounted on input shaft 5 by means of splines running ill the axial direction so that clutch hub 6a and input shaft 5 can slide axially relative to one another but must rotate together. Clutch sleeve 6 is similarly mounted on clutch hub 6a. Radially movably disposed synchronizer keys (not shown) are mounted in clutch hub 6a and biased toward the clutch sleeve 6 by springs (also not shown). The synchronizer keys cause clutch hub 6a and clutch sleeve 6 to move together in the axial direction until the axial force applied on clutch sleeve 6 rises above a predetermined value.

When clutch sleeve 6 is moved next to either gear 12 or 23, dogs located on gear 12 or 23 engage with the splines on the inner periphery of clutch sleeve 6. When the dogs on either gear are engaged with the splines on clutch sleeve 6, that gear must rotate with input shaft 5 and will transmit power to reduction shaft 4.

During a speed change, the shahs and gears are rotating, and the rotation of clutch sleeve 6 and either gear 12 or 23 must be synchronous before the dogs on one of said gears can engage with the splines on clutch sleeve 6. This synchronization is accomplished by means of synchronizer rings 50 or 51 respectively. When clutch hub 6a and clutch sleeve 6 are moved toward gear 12, for example, mating conical friction surfaces on synchronizer ring 50 and gear 12, and on synchronizer ring 50 and clutch hub 6a engage. At this point, dogs on synchronizer ring 50 are slightly out of alignment with those on gear 12 and the splines on clutch sleeve 6, preventing clutch sleeve 6 from engaging with gear 12. The conical friction surfaces cause gear 12, synchronizer ring 50, clutch hub 6a, and clutch sleeve 6 to rotate synchronously. When rotation becomes synchronous, synchronizer ring 50 shifts slightly, allowing clutch sleeve 6 to slide axially relative to clutch hub 6a and to engage the dogs on gear 12. At this point, gear 12 must rotate with input shaft 5, and power can be transferred from input shaft 5 through gears 12 and 21 to reduction shaft 4.

The synchromesh unit consisting of clutch hub 6a, clutch sleeve 6, and synchronizer rings 50 and 51 allows gear 12 or 23 to be selectively coupled with output shaft 5. Because synchronizer rings 50 and 51 prevent the splines at the inner periphery of clutch sleeve 6 from engaging with dogs on gears 12 and 23 until synchronization is completed, speed changes are quiet and smooth. A similar synchromesh unit consisting of clutch hub 7a, clutch sleeve 7, and synchronizer rings 52 and 53 allows gear 18 or 17 to be selectively coupled with reduction shaft 4. The two synchromesh units and related parts described above form a mechanical speed change gear which allows the operator to choose from three forward drive ratios and one reverse drive ratio between input shaft 5 and reduction shaft 4.

Gear 25 or 26 can be selectively coupled with output shaft 3 by means of a shift slider 8, forming a mechanical speed change gear with two drive ratios between reduction shaft 4 and output shaft 3.

Output shaft 3 projects into a differential gear casing 1a formed at the rear of the housing 1. A pinion 3a formed on end portion output shaft 3 engages with a differential ring gear 32 at a differential gear unit D, transmitting power to an axles 33. Running wheels (not shown) are fixed on axles 33.

Figure 2:
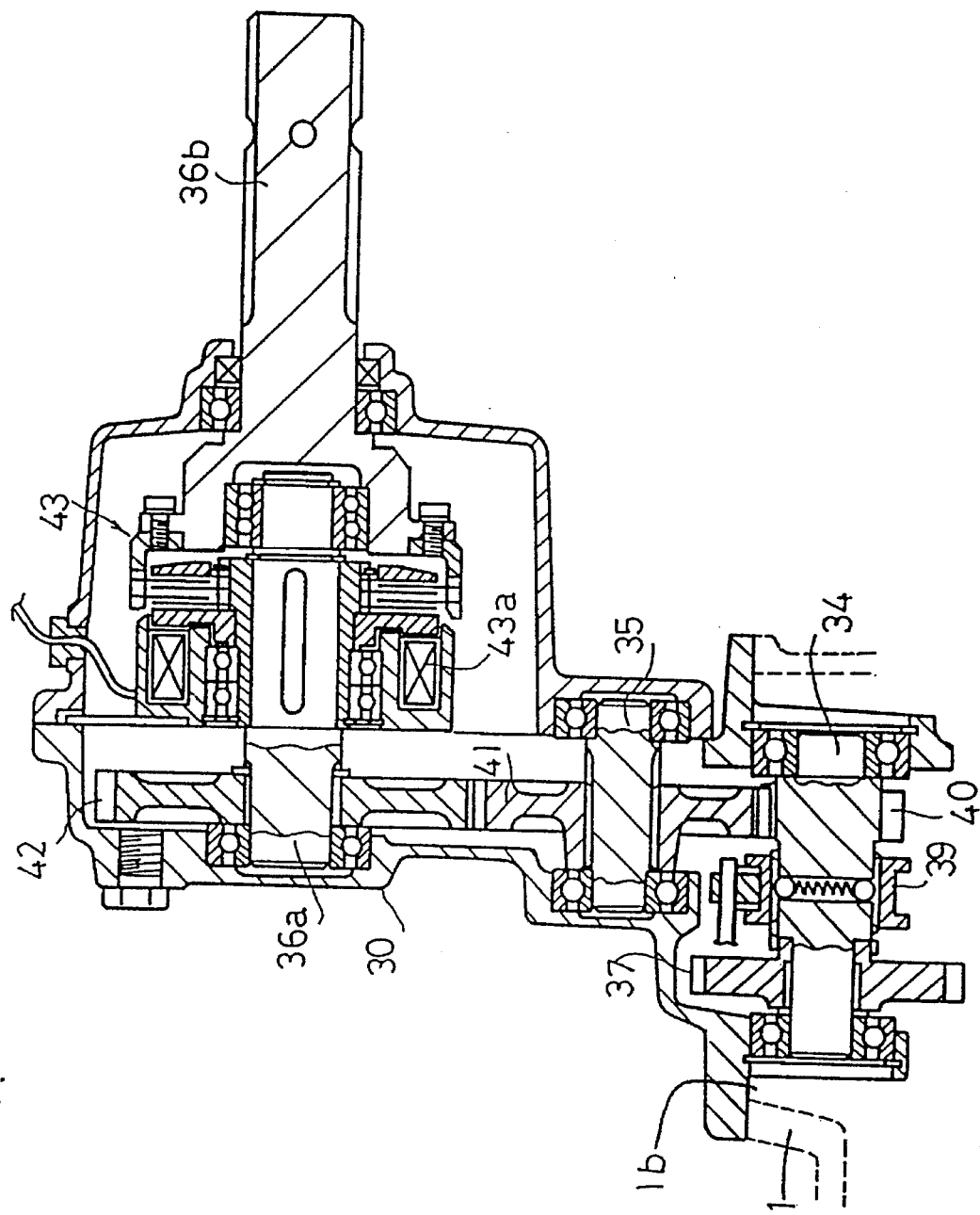
FIG. 2 is a sectional side view of a power take-out unit with an electromagnetic clutch.

Referring now to FIG. 2, the power take-off mechanism will be described. A power take-off casing 30 is attached to an opening 1b in the upper surface of housing 1. A clutch shaft 34, a counter shaft 35 and a power take-off shaft 36 are horizontally mounted in casing member 30. An input gear 37 is mounted on, but rotates independently of, clutch shaft 34, and is permanently engaged with the power take-off gear 13. A clutch slider 39 is spline-fitted onto clutch shaft 34, and can be moved axially to engage input gear 37 with clutch shaft 34. When gear 37 is engaged with clutch shaft 34, power is transmitted from input shaft 5 through gears 13 and 37 to clutch shaft 34. A splined gear 40, a gear 41, and a gear 42 are mounted on and rotate with clutch shaft 34, counter shaft 35, and a front section 36a of a power take-off shaft 36, respectively. Gear 41 is permanently engaged with both gear 40 and gear 42. Power take-off shaft 36 is divided into front shaft 36a and a rear shaft 36b. Shafts 36a and 36b are connected at the center of shaft 36 through an electromagnetic clutch 43. When a solenoid 43a is energized, friction plates in electromagnetic clutch 43 are engaged, and shafts 36a and 36b rotate as a unit. Shafts 34, 35, and 36, gears 13, 37, 40, 41, and 42, and clutch 43 constitute the drive route from input shaft 5 to the operating device.

Figure 3:
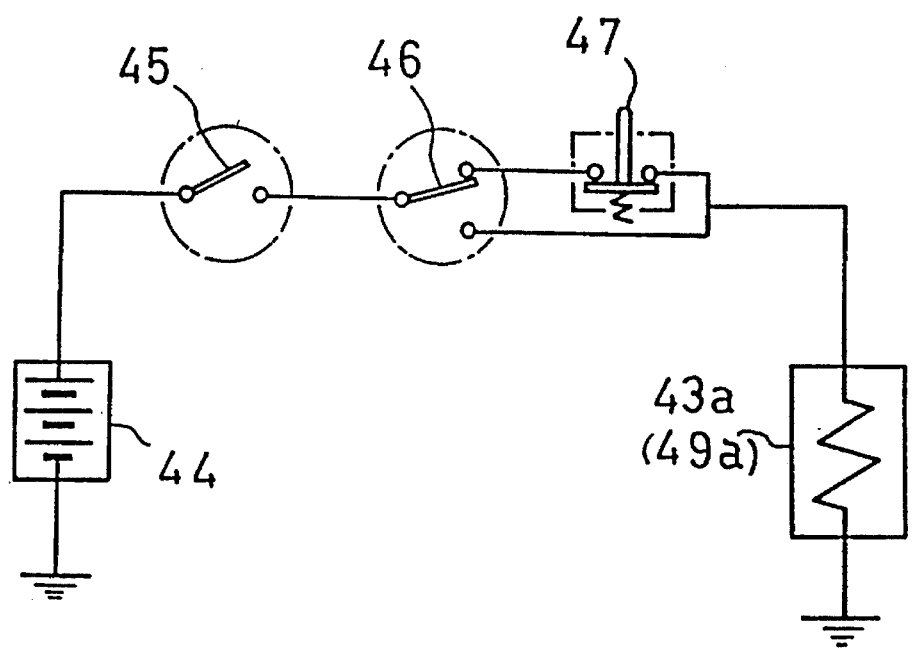
FIG. 3 is an electronic circuit diagram of a clutch actuation unit.

Referring now to FIG. 3, solenoid 43a is connected in series with a clutch on-off switch 45, a speed change sensing switch 47, and a battery (power source) 44. Clutch on-off switch 45 allows the driver to engage or disengage clutch 43, controlling power transfer to the operating device even when gear 37 is engaged to shaft 34 by means of slider 39, transmitting power to the power take-off drive path. Operating device change-over switch 46 can short circuit speed change sensing switch 47, removing it from the series. Speed change sensing switch 47 is disposed either at a link system of a main clutch pedal (not shown) for controlling main clutch 9, or on a grip of a speed change lever (not shown) that operates clutch sleeves 6 and 7, and cuts off power to solenoid 43a whenever the operator is changing speeds.

When an operating device with a large inertia is attached to power take-off shaft 36, operating device inertia change-over switch 46 should enable speed change sensing switch 47. Speed change sensing switch 47 is opened whenever the operator is changing speeds, and is closed otherwise. When not short circuited by switch 46, speed change sensing switch 47 shuts off solenoid 43a and disengages clutch 43 whenever the operator is changing speeds. This cuts off the power transmission to, and inertial rotation from, the operating device. As a result, inertial rotation from the operating device is not transmitted to input shaft 5 during speed changes.

When an operating device with a low inertia is attached to power take-out shaft 36, operating device change-over switch 46 should short circuit speed change sensing switch 47. In this case, speed change sensing switch 47 has no effect on the state of electromagnetic solenoid 43a, which is controlled only by clutch switch 45. As a result, inertial rotation from the operating device will be transmitted to input shaft 5 during speed changes, but the inertia is low so there is no problem.

Figure 4:
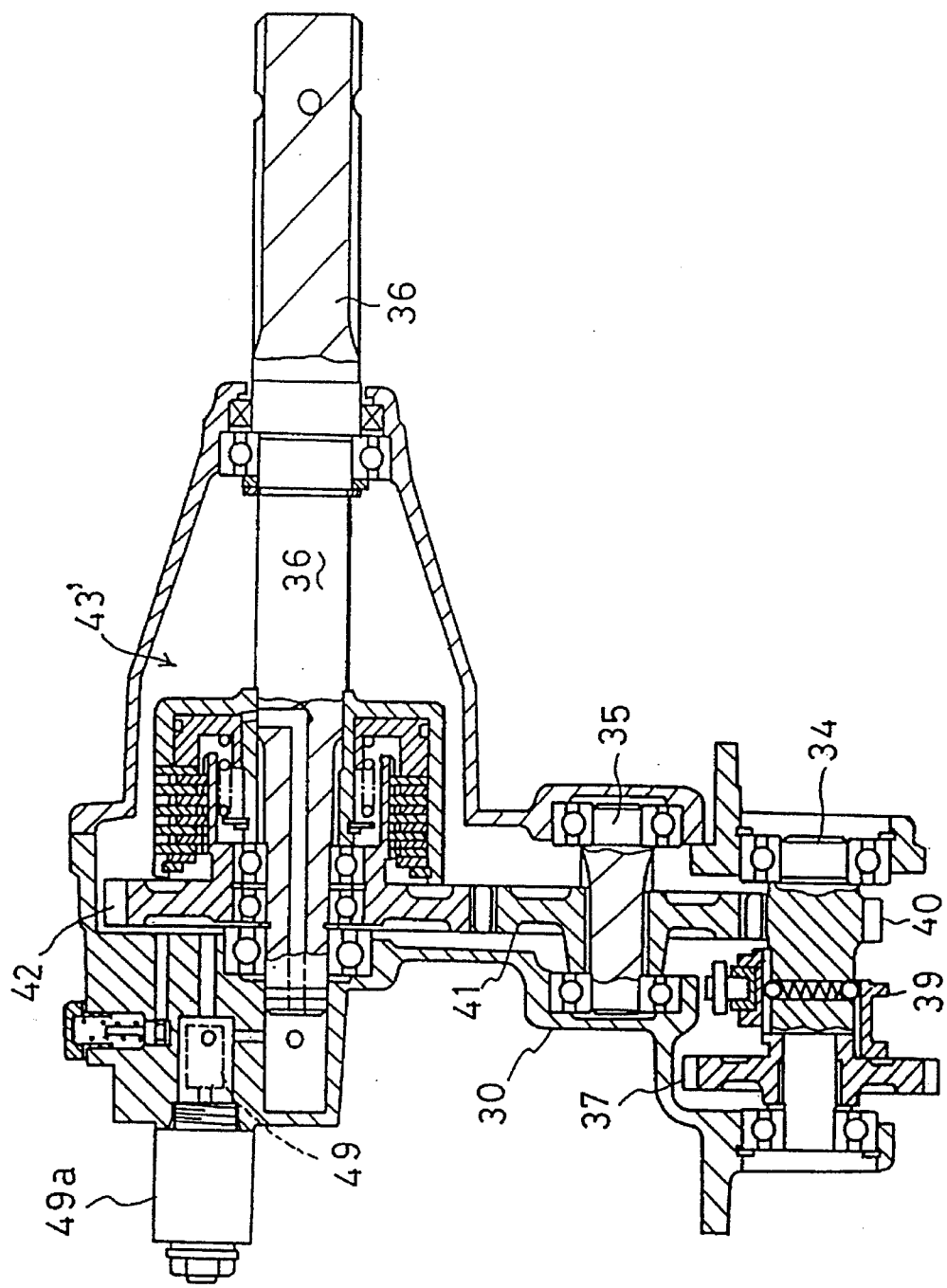
FIG. 4 is a sectional side view of a power take-out unit of an alternate embodiment of the present invention using a hydraulic actuation clutch.
Figure 5:
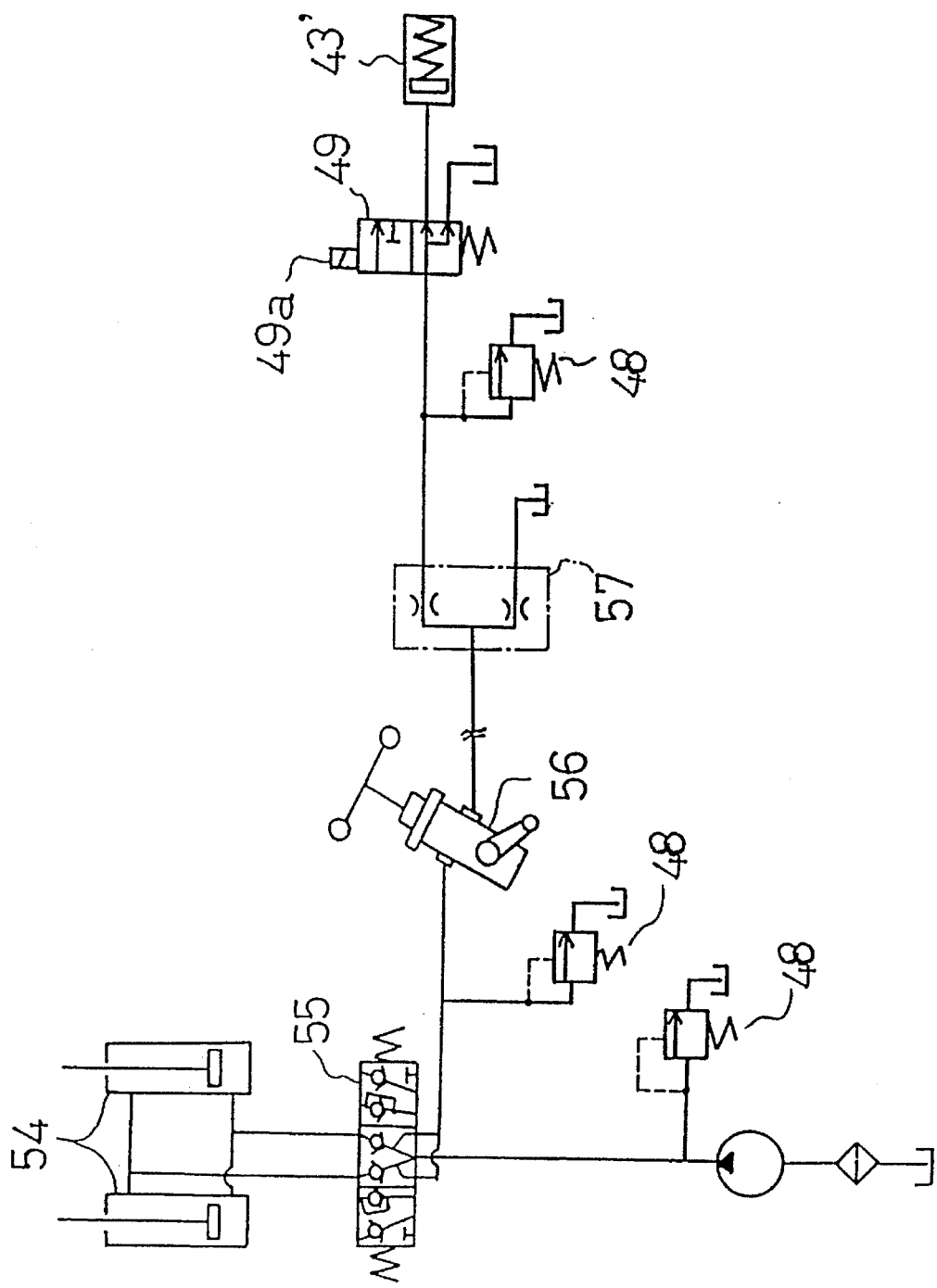
FIG. 5 is a hydraulic circuit diagram.

FIGS. 4 and 5 show an alternate embodiment in which a hydraulic actuation type clutch 43' is used instead of the electromagnetic clutch 43 of FIGS. 2 and 3. A solenoid valve 49, attached to casing member 30, feeds pressurized oil to clutch 43. An electromagnetic solenoid 49a, of similar construction as solenoid 43a, is controlled as shown in FIG. 3.

FIG. 5 shows how pressurized oil is fed to the clutch 43'. Pump cylinders 54 and a directional control valve 55 feed pressurized oil into the system. The pressurized oil passes through and actuates a power steering system 56. The flow of pressurized oil is then reduced by a flow dividing valve 57. The remaining oil is ted to solenoid valve 49. An electromagnetic solenoid 49a, controlled as shown in FIG. 3, regulates the flow of pressurized oil through solenoid valve 49 to clutch 43'. When electromagnetic solenoid 49a is energized, clutch 43' is receives pressurized oil and is engaged. When electromagnetic solenoid 49a is not energized, the flow of pressurized oil to clutch 43' is blocked, and the oil in clutch 43' is discharged, disengaging clutch 43'. Several pressure release valves 48 located throughout the system discharge some oil if the pressure goes above a predetermined limit.

The present invention is not limited to the embodiments shown in which a clutch is housed in casing member 30. Alternatives may involve an electromagnetic clutch or a belt tension clutch disposed between power take-out shaft 36 and, the input shaft of an operating device.

The working vehicle transmission disclosed is intended mainly for garden management, where the operating device is a leaf blower, a rotary mower, a brush chipper, a sprayer, or the like. Clutch switch 45 allows the operator to load the operating device according to usage, and power take-off shaft 36 serves as the driving source.

As seen from the above description, the present invention performs speed changes smoothly. When the operator changes speeds, the clutch disposed between input shaft 5 and the operating device is automatically disengaged. As a result, the inertial rotation of the operating device has no effect on input shaft 5. Freed of the influence of inertial rotation, the synchromesh units can operate properly, and clutch sleeves 6 and 7 can be moved smoothly to the desired position by means of a speed change lever (not shown). Speeds can be changed even when the operating device is being driven without the need for manual operation of the clutch which controls the operating device. The problems of gear breakdown, noises, and wear of the synchronizer rings which could otherwise be caused by the inertial rotation of the operating device during speed changes are therefore eliminated.

In addition, the clutch disposed between input shaft 5 and the operating device is designed in a modular fashion, allowing the power take-off mechanism to be built separately from the rest of the transmission. As a result, the transmission of the present invention can be built less expensively than one using an independent power take-off mechanism with a dual-clutch. The present invention is so inexpensive to produce that it can be economically used for applications that do not require a power take-off mechanism.

While preferred embodiments have been set forth, various modifications, alterations, and changes may be made without departing from the spirit and scope of the present invention as defined in the appended claims.

What is claimed is:

1. A vehicle transmission, comprising:

an input shaft connected to an engine through a first clutch;

an output shaft connected to an axle through a differential gear;

a mechanical speed change gear comprising a synchromesh unit disposed between said input shaft and said output shaft;

a drive route for transmitting power from said input shaft to an operating device;

a second clutch disposed along said drive route;

a sensing means for sensing that one of said first clutch and said synchromesh unit is operated to be disengaged; and a control device, operably connected to said second clutch, which automatically disengages said second clutch whenever said sensing means senses that one of said first clutch and said synchromesh unit is disengaged, thereby interrupting the transmission of power from said input shaft to said operating device.

2. A vehicle transmission as set forth in claim 1 further comprising:

a housing which contains said mechanical speed change gear;

a power take-off casing detachably mounted on said housing; and a rotatable power take-off shaft supported in said power take-off casing, wherein said drive route for transmitting power from said input shaft to said power take-off shaft and said second clutch are enclosed in said power take-off casing.

3. A vehicle transmission as set forth in claim 1, wherein said second clutch is an electromagnetic actuation type clutch, and said control device comprises an electromagnetic solenoid which controls said second clutch, and a switch which changes the state of said electromagnetic solenoid for the duration of any speed change performed by said mechanical speed change gear, thereby disengaging said second clutch.

4. A vehicle transmission as set forth in claim 1, wherein said second clutch is a hydraulic actuation type clutch, and said control device comprises a solenoid valve for changing over feed and discharge of operating oil to said second clutch, and said solenoid valve is controlled by an electromagnetic solenoid which is controlled by a switch which changes the state of said electromagnetic solenoid for the duration of any speed change performed by said mechanical speed change gear, thereby disengaging said second clutch.

5. A vehicle transmission, comprising:

an input shaft connected to an engine through a first clutch;

an output shaft connected to an axle through a differential gear;

a mechanical speed change gear comprising a synchromesh unit disposed between said input shaft and said output shaft:

a drive route for transmitting power from said input shaft to an operating device;

a second clutch disposed along said drive route;

a sensing means for sensing that said first clutch is operated to be disengaged; and a control device, operably connected to said second clutch, which automatically disengages said second clutch whenever said sensing means senses that said first clutch is disengaged, thereby interrupting the transmission of power from said input shaft to said operating device.

6. A vehicle transmission as set forth in claim 5, further comprising:

a housing which contains said mechanical speed change gear;

a power take-off casing detachably mounted on said housing; and a rotatable power take-off shaft supported in said power take-off casing, wherein said drive route for transmitting power from said input shaft to said power take-off shaft and said second clutch are enclosed in said power take-off casing.

7. A vehicle transmission, comprising:

an input shaft connected to an engine through a first clutch;

an output shaft connected to an axle through a differential gear;

a mechanical speed change gear comprising a synchromesh unit disposed between said input shaft and said output shaft:

a drive route for transmitting power from said input shaft to an operating device;

a second clutch disposed along said drive route;

a sensing means for sensing that said first clutch is operated to be disengaged; and a control device, operably connected to said second clutch, which automatically disengages said second clutch whenever said sensing means senses that said first clutch is disengaged, thereby interrupting the transmission of power from said input shaft to said operating device, wherein said second clutch is a hydraulic actuation type clutch, and said control device comprises a solenoid valve for changing over feed and discharge of operating oil to said second clutch, and said solenoid valve is controlled by an electromagnetic solenoid which is controlled by said sensing means, thereby disengaging said second clutch.

8. A vehicle transmission, comprising:

an input shaft connected to an engine through a first clutch;

an output shaft connected to an axle through a differential gear;

a mechanical speed change gear comprising a synchromesh unit disposed between said input shaft and said output shaft;

a drive route for transmitting power from said input shaft to an operating device;

a second clutch disposed along said drive route;

a sensing means for sensing that said synchromesh unit is operated to be disengaged; and a control device, operably connected to said second clutch, which automatically disengages said second clutch whenever said sensing means senses that said synchromesh unit is disengaged, thereby interrupting the transmission of power from said input shaft to said operating device.

9. A vehicle transmission as set forth in claim 8, further comprising:

a housing which contains said mechanical speed change gear;

a power take-off casing detachably mounted on said housing; and a rotatable power take-off shaft supported in said power take-off casing, wherein said drive route for transmitting power from said input shaft to said power take-off shaft and said second clutch are enclosed in said power take-off casing.

10. A vehicle transmission, comprising:

an input shaft connected to an engine through a first clutch;

an output shaft connected to an axle through a differential gear;

a mechanical speed change gear comprising a synchromesh unit disposed between said input shaft and said output shaft;

a drive route for transmitting power from said input shaft to an operating device;

a second clutch disposed along said drive route;

a sensing means for sensing that said synchromesh unit is operated to be disengaged; and a control device, operably connected to said second clutch, which automatically disengages said second clutch whenever said sensing means senses that synchromesh unit is disengaged, thereby interrupting the transmission of power from said input shaft to said operating device, wherein said second clutch is a hydraulic actuation type clutch, and said control device comprises a solenoid valve for changing over feed and discharge of operating oil to said second clutch, and said solenoid valve is controlled by an electromagnetic solenoid which is controlled by said sensing means, thereby disengaging said second clutch.

* * * * *